United States Patent
Forrest et al.

(10) Patent No.: US 6,293,115 B1
(45) Date of Patent: Sep. 25, 2001

(54) INLET AIR MIXTURE CONTROL METHOD FOR A VEHICLE AIR CONDITIONING SYSTEM

(75) Inventors: Wayne Oliver Forrest, Gasport; Elliott D. Keen, Lockport, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/546,278

(22) Filed: Apr. 10, 2000

(51) Int. Cl.[7] .................................................. F25D 17/04
(52) U.S. Cl. ............................................................ 62/186
(58) Field of Search ............................. 62/186, 177, 132, 62/244; 236/49.3, 91; 165/244, 16, 42; 417/2

(56) References Cited

U.S. PATENT DOCUMENTS

| | | | |
|---|---|---|---|
| 4,265,597 | * 5/1981 | Payne et al. ........................ | 417/32 |
| 4,537,035 | * 8/1985 | Stiles ................................. | 62/89 |
| 4,759,269 | * 7/1988 | Brown et al. ...................... | 454/75 |
| 4,892,135 | * 1/1990 | Sakurada et al. .................. | 165/42 |
| 4,974,664 | * 12/1990 | Glennon et al. .................... | 165/271 |
| 5,127,576 | * 7/1992 | Weatherhead et al. . | |
| 5,267,451 | * 12/1993 | Cleveland .......................... | 62/186 |
| 5,385,030 | * 1/1995 | Kitaagawa et al. ................ | 62/160 |
| 5,511,724 | * 4/1996 | Freiberger et al. ................ | 236/49.3 |
| 5,619,862 | * 4/1997 | Ruger et al. ....................... | 62/409 |
| 5,649,429 | * 7/1997 | Schreiber .......................... | 62/186 |
| 6,134,895 | * 10/2000 | Poloskey et al. .................. | 62/97 |
| 6,151,903 | * 11/2000 | Hironaka .......................... | 62/176.6 |

* cited by examiner

*Primary Examiner*—Teresa Walberg
*Assistant Examiner*—Daniel Robinson
(74) *Attorney, Agent, or Firm*—Patrick M. Griffin

(57) ABSTRACT

An improved method for controlling inlet air mixing in a vehicle air conditioning system having an air inlet mixing device, wherein the mixing device is controlled under predefined operating conditions to improve vehicle fuel economy and achieve performance improvements associated with cabin air recirculation while maintaining a predefined level of outside air flow in the inlet air mixture of the system. The overall air flow is determined by the speed of an inlet air blower motor, and the control is enabled under high thermal loading to adjust the inlet air mixing device as a function of the blower motor speed so that the predetermined level of outside air flow is preserved regardless of the blower motor speed.

6 Claims, 3 Drawing Sheets

INLET AIR MIXTURE CONTROL METHOD FOR A VEHICLE AIR CONDITIONING SYSTEM

TECHNICAL FIELD

This invention relates to a vehicle air conditioning system having an inlet air mixing device, and more particularly to a control method for the inlet air mixing device that improves system efficiency and performance.

BACKGROUND OF THE INVENTION

A vehicle air conditioning system performs two primary functions: temperature regulation and dehumidification. These functions and the vehicle fuel economy can usually be enhanced by drawing at least a portion of the inlet air from the cabin of the vehicle after an initial cool-down period of operation because the introduction of cabin air generally reduces the enthalpy of the inlet air mixture. In most manually controlled systems, introducing cabin air into the inlet air-stream is achieved with a mechanical bleed device designed to maintain a given proportion of cabin air and outside air. In some manually controlled systems and most automatically controlled systems, inlet air mixing is achieved with an inlet air mixing device (such as controlled door in an inlet duct), with the inlet air mixture comprising predominantly outside air in a normal mode and predominantly cabin air in a recirculation mode. In the manually controlled versions, the operator selects either the normal or recirculation mode, while in the automatically controlled versions, the selection is performed by a system controller based on various input parameters such as the desired cabin temperature, the measured cabin temperature, and so on. In any event, it is commonly recommended that the usage of cabin air recirculation be limited in order to more effectively purge odors and smoke generated in the cabin, and in order to prevent intrusion of exhaust gases under certain conditions. Additionally, extended operation in the recirculation mode can tend to lower the relative humidity of the cabin air to an uncomfortable level.

SUMMARY OF THE INVENTION

The present invention is directed to an improved method for controlling inlet air mixing in a vehicle air conditioning system having an air inlet mixing device for admitting inlet air from outside and/or inside the vehicle cabin, wherein the mixing device is controlled under predefined operating conditions to reduce compressor power consumption and achieve performance improvements associated with cabin air recirculation while maintaining a predefined level of outside air flow in the inlet air mixture of the system. The overall air flow is determined by the speed of an inlet air blower motor, and the control of this invention is enabled under high thermal loading to adjust the inlet air mixing device as a function of the blower motor speed so that the predetermined level of outside air flow is preserved regardless of the blower motor speed.

DESCRIPTION OF THE PREFERRED EMBODIMENT

Figure 1:
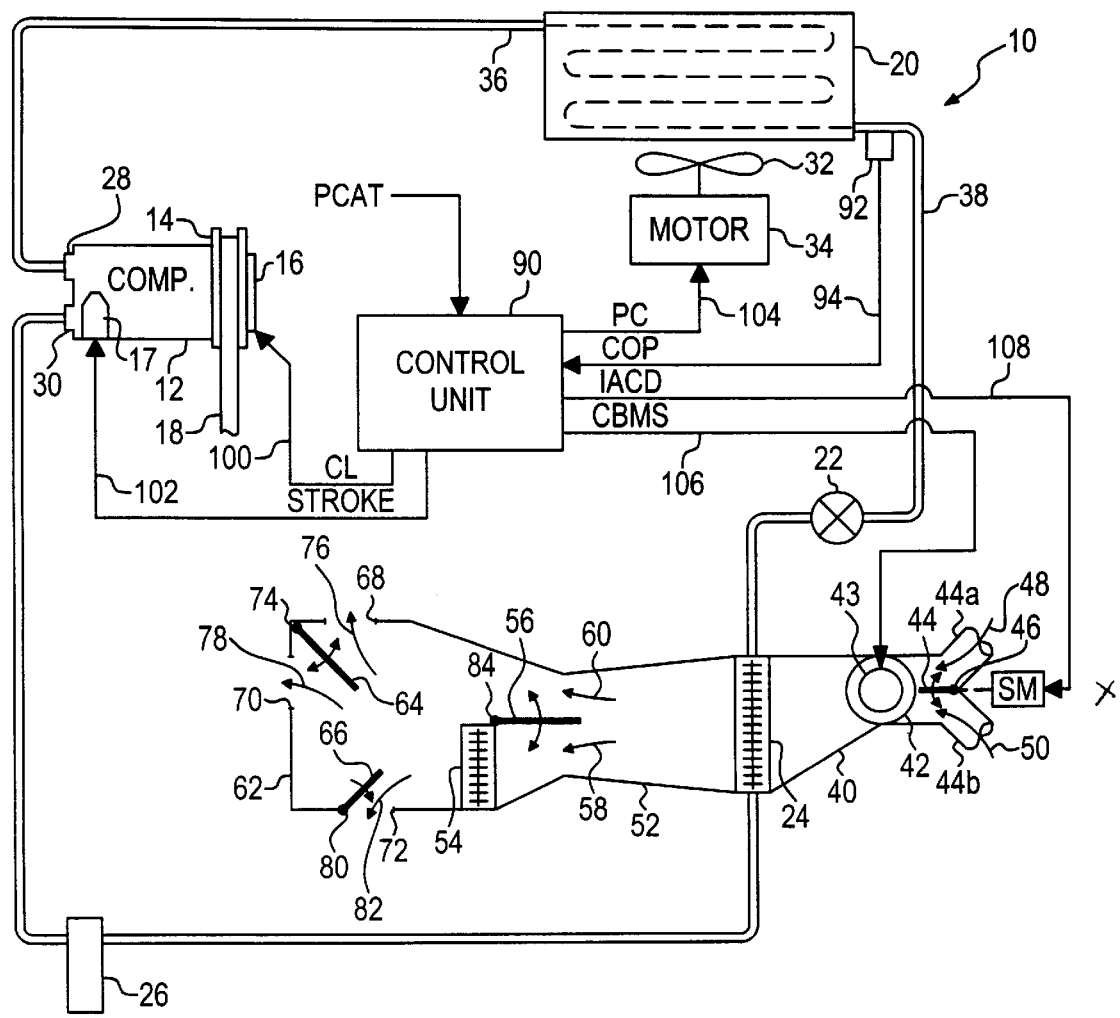
FIG. 1 is a block diagram of a vehicle air conditioning system according to this invention, including a microprocessor based control unit.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a variable stroke for adjusting its capacity, and includes a stroke control valve 17 that is electrically activated to effect capacity control. The pulley 14 is coupled to a rotary shaft of the vehicle engine (not shown) via drive belt 18, and the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes that conduct engine coolant. The heater core 54 effectively bifurcates the outlet duct 52, and a re-heat door 56 pivoted at a point 84 next to heater core 54 is adjustable as shown to control how much of the air must pass through the heater core 54. Air passing through heater core 54 is indicated by the arrow 58, while air by-passing the heater core 54 is indicated by the arrow 60. The heated and un-heated air portions are mixed in a plenum portion 62 of outlet duct 52 downstream of re-heat door 56, and a pair of mode control doors 64, 66 direct the mixed air through one or more outlets, including a defrost outlet 68, a panel outlet 70, and a heater outlet 72. The mode control door 64 is pivoted at point 74, and is adjustable as shown to switch the outlet air between the defrost and panel outlets 68, 70, as indicated by arrows 76, 78, respectively. The mode control door 66 is pivoted at point 80, and is adjustable as shown to control airflow through the heater outlet 72, as indicted by arrow 82.

The system 10 is controlled by the microprocessor-based control unit 90 based on various inputs. In the illustrated embodiment, such inputs include: passenger compartment air temperature PCAT, condenser outlet pressure COP, and the usual operator demand inputs, such as the desired temperature, and override controls for the speed of blower 42. The condenser outlet pressure COP is detected by a pressure sensor 92 that is coupled to line 38 at the outlet of condenser 20 and that produces an electrical representation of the sensed pressure on line 94. In an automatically controlled system such as illustrated in FIG. 1, the commanded blower motor speed CBMS is obtained from the control unit 90 itself, which either sets the speed in accordance with a base control or in accordance with an operator override of the base control. In a manually controlled system, CBMS is provided as input to control unit 90 based on the position of an operator manipulated blower motor speed selector switch (not shown). Alternately, of course, a speed sensor may be provided for measuring the actual speed of blower 42 or blower motor 43.

In response to the above-mentioned inputs, the control unit 90 develops output signals for controlling the compressor clutch 16, the capacity control valve 17, the cooling blower motor 34, the blower motor 43, and the air control doors 44, 56, 64 and 66. In FIG. 1, the output signal CL for the clutch 16 appears on line 100, the output signal STROKE for the compressor appears on line 102, the output signal FC for the condenser fan control appears on line 104, and the output signal CBMS for the blower motor 43 appears on line 106. Finally, the output signal IACD for positioning the inlet air control door 44 appears on line 108, and is applied as an input to actuator SM, which in turn, is mechanically coupled to door 44. For simplicity, output signals and actuators for the air control doors 56, 64, 66 have been omitted.

According to the present invention, the control unit 90 regulates the position of inlet air control door 44 based on the speed of blower motor 43 so that the inlet air comprises only a predetermined amount of outside air regardless of the blower motor speed. In the preferred embodiment, the predetermined amount depends on the occupant capacity of the vehicle in which the system 10 is installed. A generally accepted guideline is that at least 15 cubic-feet-per-minute (CFM) of outside air should be provided for each of the vehicle occupants. For example, the predetermined amount of outside air may be set to 90 CFM for a six-passenger vehicle. At the lowest blower motor speed (120 CFM, for example), the predetermined amount of air represents a relatively high percentage (75%) of the air supplied to the cabin, whereas at the highest blower motor speed (300 CFM, for example), the predetermined amount of air represents a relatively low percentage (30%) of the air supplied to the cabin.

Figure 2:
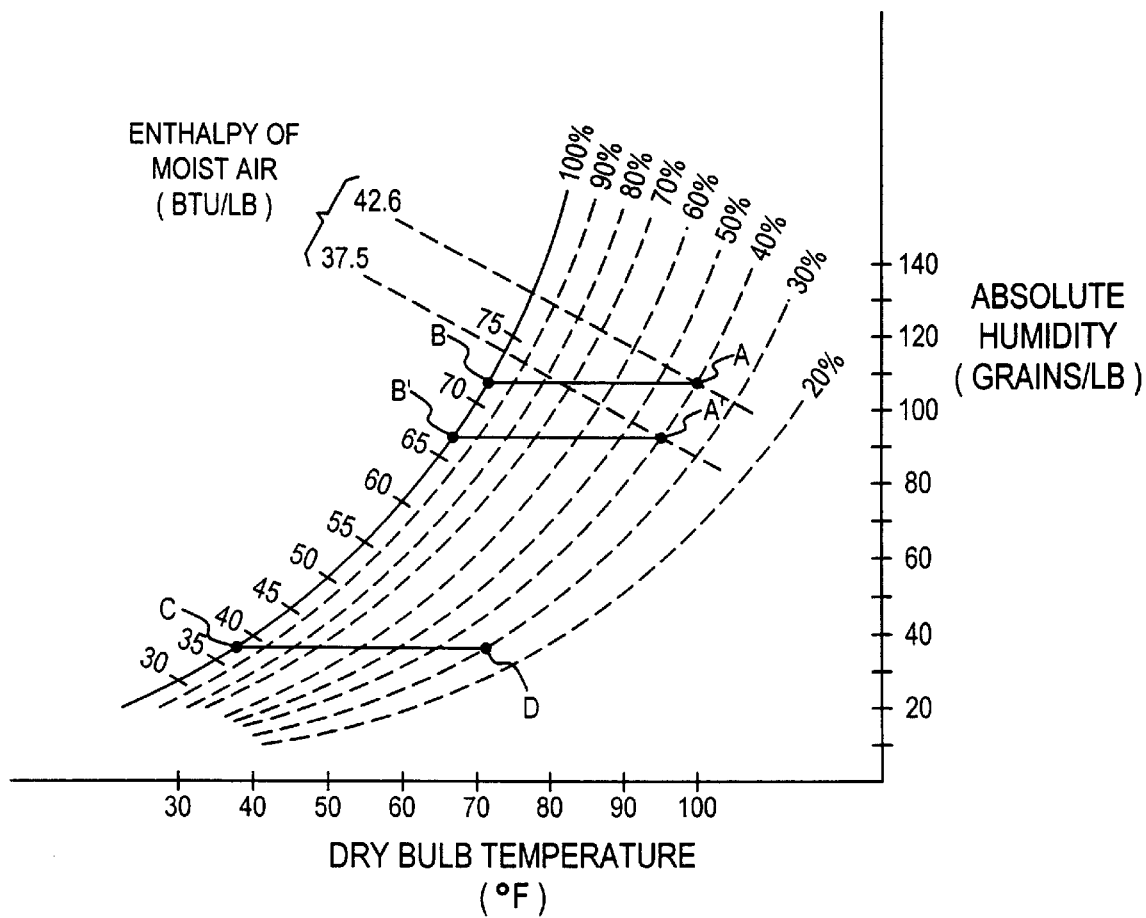
FIG. 2 is a psychrometric chart illustrating different possible operating modes of the air conditioning system of FIG. 1.

The psychrometric chart of FIG. 2 illustrates the significance of the above-described control. The chart depicts the absolute humidity of air as a function of dry bulb temperature, with the curved broken lines representing lines of constant relative humidity, and the straight broken lines representing lines of constant enthalpy. The various data points A, A', B, B', C and D represent the condition of air outside the vehicle, at various points in the ducts 40, 52, and in the passenger compartment. For example, at a low blower, stabilized condition, outside air having a dry bulb temperature of 100° F. and a relative humidity of 40% is represented by the point A. As the air passes through the evaporator 24, its dry bulb temperature decreases with no change in absolute humidity until the relative humidity rises to 100%, as depicted by the line segment A-B. As the air is further cooled, water vapor condenses on the surface of evaporator 24, with the relative humidity remaining at 100%. Under a given set of conditions, the dew point temperature of the evaporator 24 is controlled to approximately 38° F., so that air at the evaporator outlet is represented by the point C. Then, the air is re-heated by the heater core 54 so that the air temperature in the passenger compartment has a dry bulb temperature of 72° F., as represented by the point D. As the air is re-heated, its absolute humidity remains the same, but its relative humidity drops, as indicated by the line segment C-D, providing a cabin relative humidity of approximately 30%.

A similar cabin temperature and relative humidity level is achieved, but with reduced energy consumption, by adjusting the inlet air control door 44 as a function of blower motor speed, as described above. In this illustration, the outside air constitutes approximately 70% of the inlet air mixture, and is represented by the point A'. Significantly, the enthalpy, temperature, dew point and absolute humidity of the inlet air mixture is lower due to the influence of the cabin air; as a result, the net work performed by the compressor 12 to drop the temperature and humidity to the level designated by the point C is substantially reduced, as indicated by the difference in enthalpy between point A (42.6 BTU/LB) and point A' (37.5 BTU/LB). When the cooling capacity of the system 10 is limited (due to low compressor speed, for example), the passenger comfort is also improved because the inlet air mixture can be cooled and de-humidified to lower levels than outside air alone.

Figure 3:
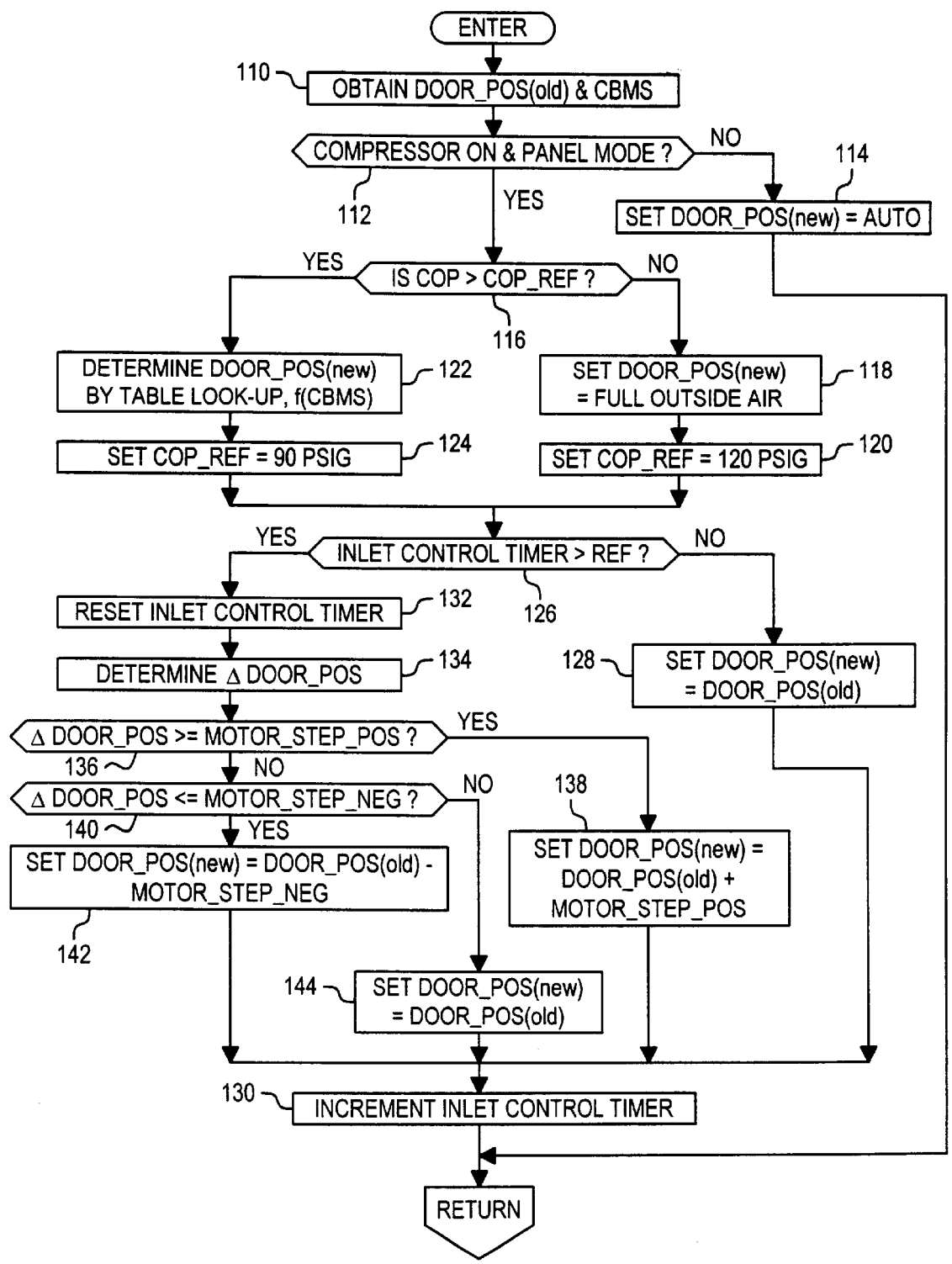
FIG. 3 is a flowchart representing computer program instructions executed by the microprocessor based control unit of FIG. 1 in carrying out the control of this invention.

FIG. 3 depicts a flow diagram representative of computer program instructions executed by the control unit 90 for carrying out the above-described control in the context of a system in which the compressor capacity is adjusted based on various inputs including the condenser outlet pressure COP. The block 110 is first executed to obtain the previous position command DOOR_POS(old) for the inlet air control door 44 and the commanded blower motor speed CBMS. The block 112 then determines if the compressor 12 is running (that is, whether clutch 16 is engaged) and the system 10 is operating in a panel discharge mode, as opposed to a defrost mode, for example. If not, the inlet air mixture control of this invention is not enabled, and the block 114 is executed to set the new position command DOOR_POS(new) for door 44 to AUTO, a position dictated by an automatic climate control algorithm carried out by control unit 90.

If block 112 is answered in the affirmative, the block 116 is executed to determine if the air conditioning load is high. In the illustrated embodiment where the condenser outlet pressure COP is measured for compressor control purposes, the air conditioning load is determined by comparing COP to a reference pressure COP_REF. In other systems, an equivalent indication of high load may be obtained based on another load-indicative parameter, such as incoming air enthalpy, condenser outlet temperature, or compressor outlet pressure or temperature. In any event, the comparison should include some hysteresis to ensure that the inlet air control does not influence the comparison. In the illustrated embodiment, the reference COP_REF is initialized at a relatively high value, such as 120 PSIG, and if COP exceeds this value (indicating high air conditioning load), the blocks 122 and 124 are executed to select an appropriate value for DOOR_POS(new) and to set COP_REF to a lower value, such as 90 PSIG. If the load is subsequently reduced, and COP falls to the lower value, the blocks 118 and 120 are executed to set DOOR_POS(new) to full outside air, and to restore COP_REF to the high value (120 PSIG).

In an alternate implementation, the load-based determination of block 116 may be replaced with a comparison of the enthalpy of the outside air relative to the cabin air. In such an implementation, DOOR_POS(new) is set to full outside air if the cabin air has a higher enthalpy than the outside air, whereas DOOR_POS(new) is determined by table look-up in accordance with this invention if the outside air has a higher enthalpy than the cabin air. Such an implementation requires knowledge of the temperature and relative humidity of both the cabin air and the outside air.

As indicated at block 122, the value of DOOR_POS (new) when the inlet air mixture control is enabled may be determined by table look-up as a function of the commanded blower motor speed CBMS (or the measured blower motor speed, as mentioned above). The table values may be determined empirically based on measured air flow through the ducts 44a, 44b at different blower motor speeds, so that the retrieved door position DOOR_POS(new) obtained from the table will result in an inlet air mixture comprising a predetermined amount (flow) of outside air, as explained above.

The block 126 is then executed to determine if the count of an INLET CONTROL TIMER exceeds a reference count REF. If not, block 128 is executed to retain the current door position (i.e., DOOR_POS(new) is set equal to DOOR_POS(old)), and the block 130 increments the INLET CONTROL TIMER. Once the count of the INLET CONTROL TIMER exceeds the reference REF, the block 132 resets the INLET CONTROL TIMER to zero and the blocks 134–144 determine an appropriate value for DOOR_POS(new). Thus, the INLET CONTROL TIMER limits the updating of the door position during inlet air mixture control to a desired maximum rate, such as one step per second.

The block 134 determines the requested change DOOR_POS in door position according to the difference [DOOR_POS(new)–DOOR_POS(old)]. If DOOR_POS indicates that the door is to be moved in a positive direction (determined by convention) by an amount at least as great as an actuator step in that direction MOTOR_STEP_POS, as determined at block 136, the block 138 sets DOOR_POS(new) equal to the sum [DOOR_POS(old )+MOTOR_STEP_POS]. On the other hand, if DOOR_POS indicates that the door is to be moved in the opposite (negative) direction by an amount at least as great as an actuator step in that direction MOTOR_STEP_NEG, as determined at block 140, the block 142 sets DOOR_POS(new) equal to the difference [DOOR_POS(old )–MOTOR_STEP_NEG]. If DOOR_POS is less than the minimum step size of actuator 109, block 144 is executed to retain the current door position by setting DOOR_POS(new) equal to DOOR_POS(old). And in any event, the block 130 is then executed as described above to increment INLET CONTROL TIMER, completing the routine.

Thus, the control unit 90 gradually adjusts the position of inlet air control door 44 under conditions of high air conditioning load to increase the amount of recirculated cabin air in the inlet air mixture, while retaining a predetermined amount of outside air, thereby improving both the efficiency and performance of the air conditioning system 10. While described in reference to the illustrated embodiment, it is expected that various modifications in addition to those mentioned above will occur to those skilled in the art. For example, the control of this invention may be applied to air conditioning systems configured differently than shown in FIG. 1; for example, systems having a fixed displacement compressor, or utilizing a different capacity control methodology. Thus, it will be understood that methods incorporating these and other modifications may fall within the scope of this invention, which is defined by the appended claims.

What is claimed is:

1. A method of operation for a vehicle air conditioning system including an inlet air mixing device for admitting inlet air from outside and/or inside a vehicle cabin, and an inlet air blower driven by an electric blower motor to control a flow magnitude of the inlet air, the method comprising the steps of:

determining a speed of the blower;

using the determined blower speed to retrieve an operating state of the inlet air mixing device from a table of previously determined operating states stored as a function of inlet air blower speed for proportioning the admitted inlet air between air from outside and inside the vehicle cabin such that the amount of air admitted from outside the vehicle cabin is substantially equal to a predetermined amount regardless of the blower speed; and controlling the inlet air mixing device in accordance with the retrieved operating state.

2. The method of operation of claim 1, wherein the system includes a control unit that commands the speed of the blower motor, and the blower speed is determined based on the commanded speed.

3. The method of operation of claim 1, wherein the system includes a control unit responsive to an operator input indicative of a desired speed of the blower motor, and the blower speed is determined based on the operator input.

4. The method of operation of claim 1, including the steps of:

detecting a condition of high air conditioning load;

controlling the inlet air mixing device in accordance with the retrieved operating state when the condition of high air conditioning load is detected; and controlling inlet air mixing device to admit substantially only air from outside the vehicle cabin when the condition of high air conditioning load is not detected.

5. The method of operation of claim 1, including the steps of:

controlling the inlet air mixing device in accordance with the retrieved operating state when an enthalpy of the air outside the vehicle cabin is higher than an enthalpy of the air inside the vehicle cabin; and controlling the inlet air mixing device to admit substantially only air from outside the vehicle cabin when the enthalpy of the air inside the vehicle cabin is higher than the enthalpy of the air outside the vehicle cabin.

6. The method of operation of claim 1, wherein the step of controlling the inlet air mixing device includes the step of:

adjusting an actual operating state of the inlet air mixing device based on a difference between the actual operating state and the retrieved operating state; and limiting a rate of adjustment of the actual operating state to a predetermined rate.

* * * * *